United States Patent Office 2,915,520
Patented Dec. 1, 1959

2,915,520

PROCESS OF DEASHING CELLULOSE ETHERS

John F. McAndrew, Chicago, Ill., assignor to Hercules Powder Company, Wilmington, Del., a corporation of Delaware No Drawing. Application July 9, 1956
Serial No. 596,458

10 Claims. (Cl. 260—232)

This invention relates to a method for the removal of ash from thermoplastic cellulose ethers.

In the manufacture of ethyl cellulose, as well as other cellulose ethers, there is normally a side-reaction which results in the formation of a small number of carboxyl groups on the molecule. The alkaline system used for ethylation causes these carboxyls to exist in the neutral, sodium salt form. In analysis of the ethyl cellulose there is, therefore, a measurable ash content. For many commercial uses, this ash content is either desirable or unimportant. However, there are some uses where it is important that the ash be reduced or eliminated.

It is known that a reduction in the ash content of thermoplastic cellulose ethers can be effected by deashing in aqueous acidic media or with aqueous solutions containing a water-miscible organic solvent for the cellulose ether. However, it has been observed that when deashing is carried out in aqueous acidic media, it is not possible to obtain the low ash content required for some applications. Deashing with aqueous solutions containing an organic solvent for the cellulose ether, on the other hand, gives effective deashing if the concentration of solvent is relatively high, i.e., of the order of about 30% to 50%. However, at lower solvent concentrations, i.e., at concentrations below about 25% and usually below about 30%, it is impossible to obtain adequate deashing with the desired low level of ash content.

A principal object of the present invention is to improve the deashing of thermoplastic cellulose ethers with aqueous solutions containing a water-miscible organic solvent for the cellulose ether whereby adequate deashing is obtained with lower solvent concentrations than has previously been required for this purpose. This is advantageous and desirable since it (1) reduces cellulose ether yield loss, (2) reduces solvent usage, and (3) provides optimum product extrusion quality.

In accordance with the present invention, it has been found that improved deashing of thermoplastic cellulose ethers is obtained if the same are treated with an acidified aqueous solution of a water-miscible organic solvent for the cellulose ether in the presence of a surfactant material. Utilizing this process, the level of deashing previously obtainable at a given solvent concentration is now obtainable at a substantially lower solvent concentration, thereby rendering the process more economical and more productive. Moreover, as indicated above, the process provides optimum product extrusion quality.

The following examples will illustrate the invention.

EXAMPLES 1-14

In these examples the cellulose ether treated was an ethyl cellulose having an ethoxyl content of 46.2% and a viscosity of 62 centipoises when dissolved in a solvent consisting of 80 parts toluene and 20 parts ethanol to give a 5% solution. The following procedure was utilized. The ethyl cellulose was slurried in a 20% isopropanol-water mixture containing the surfactant material. The concentration of the ethyl cellulose was about 12 to 15% based on the mixture. The pH of the slurry was then adjusted to 2.0 with concentrated hydrochloric acid, and the acidified slurry agitated for 60 minutes. Following this the ethyl cellulose was washed with demineralized water to the pH of the water, i.e., about pH 6, and then dried in a vacuum tray drier. A sample of the dried ethyl cellulose was then analyzed for carboxyl ash and percent neutralization. The results of the test are shown in Table I.

*Table I*

IONIC

| Example No. | Wetting Agent | Conc. of Wetting Agent, Percent | Carboxyl Ash, Percent |
|---|---|---|---|
| 1 | Tergitol "4" | 0.0512 | 0.08 |
| 2 | ___do___ | 0.477 | 0.004 |
| 3 | Sulfonate OA 5 | 0.1020 | 0.09 |
| 4 | ___do___ | 0.470 | 0.01 |
| 5 | Ultrawet 35KX | 0.0158 | 0.10 |
| 6 | ___do___ | 0.1120 | 0.06 |
| 7 | ___do___ | 0.474 | 0.03 |
| 8 | None | | 0.18 |

NONIONIC

| Example No. | Wetting Agent | Conc. of Wetting Agent, Percent | Carboxyl Ash, Percent |
|---|---|---|---|
| 9 | Synthetics AF-200 | 0.1010 | 0.10 |
| 10 | ___do___ | 0.466 | 0.12 |
| 11 | Synthetics AD-400 | 0.471 | 0.13 |
| 12 | Tween 60 | 0.052 | 0.14 |
| 13 | ___do___ | 0.201 | 0.14 |
| 14 | None | | 0.20 |

EXAMPLE 15

Ethyl cellulose having an ethoxyl content of 48.1 and a viscosity of 10.3 centipoises when dissolved in a solvent consisting of 80 parts toluene and 20 parts ethanol to give a 5% solution was utilized in this example. The ethyl cellulose was slurried in a 25% isopropanol-water mixture, following which 0.2% of a surfactant consisting of Sulfonate OA 5 was added to the slurry. The pH of the slurry was then lowered to 2.0 by the addition of concentrated hydrochloric acid and the acidified slurry allowed to agitate for 1½ hours. The liquid was then drained from the slurry and the ethyl cellulose washed to at least pH 4.5 with distilled water. A stabilizer consisting 1.25% of diamylphenol (in emulsion) was added to the last wash and the ethyl cellulose allowed to stand for ½ hour before draining. The deashed sample was then dried in a tray vacuum drier and pulverized. The ash content of the deashed ethyl cellulose was 0.01% (as carboxyl ash). The original ash content of this material was 0.32%.

EXAMPLES 16-19

In these examples the cellulose ether utilized was an ethyl cellulose having an ethoxyl content of about 46.0 and a viscosity of about 100 centipoises when dissolved in a solvent consisting of 80 parts toluene and 20 parts ethanol to give a 5% solution. The ethyl cellulose had an original ash content of 0.27% (as carboxyl ash). The procedure utilized was the same as in Examples 1-14 except that in all cases 0.2% of the surfactant was added. The results are set forth in Table II below.

*Table II*

| Example No. | Percent Alcohol | Surfactant | Temperature, °C. | Final Ash, Percent |
|---|---|---|---|---|
| 16 | 10 | None | 80 | 0.23 |
| 17 | 10 | Sulfonate OA 5 | 80 | 0.07 |
| 18 | 15 | None | 25 | 0.19 |
| 19 | 15 | Sulfonate OA 5 | 25 | 0.10 |

EXAMPLES 20-23

In these examples the cellulose ether utilized was an ethyl cellulose having an ethoxyl content of about 46.0% and a viscosity of about 100 centipoises when dissolved in a solvent consisting of 80 parts toluene and 20 parts ethanol to give a 5% solution. The ethyl cellulose had an original ash content of 0.30% (as carboxyl ash). The procedure followed was the same as in Example 1 except that in each case the surfactant was added in an amount such as to give a concentration of 0.2%.

*Table III*

| Example No. | Percent Alcohol | Surfactant | Temperature, °C. | Final Ash, percent |
|---|---|---|---|---|
| 20 | 10 | None | 80 | 0.19 |
| 21 | 10 | Sulfonate OA 5 | 80 | 0.03 |
| 22 | 15 | None | 25 | 0.16 |
| 23 | 15 | Sulfonate OA 5 | 25 | 0.09 |

EXAMPLES 24-33

These examples illustrate the use of other water-miscible organic solvents for carrying out the process of the invention. In Examples 24 and 25 the ethyl cellulose had an ethoxyl of 46.3, a viscosity of 85 centipoises, and an original ash content of 0.18%. In Examples 26-33 the ethyl cellulose had an ethoxyl content of about 46.0, a viscosity of about 100 centipoises and an original ash content of 0.26.

The following procedure was utilized. The ethyl cellulose was slurried in the organic solvent-water mixture containing 0.25% Sulfonate OA 5. The pH of the slurry was then adjusted to 2.0 with the appropriate acid and the acidified slurry allowed to agitate for 60 minutes. The ethyl cellulose was then washed with distilled water to the pH of the water and dried in a vacuum tray drier. Samples of dried ethyl cellulose were then analyzed for carboxyl ash and neutralization. The results are set forth in Table IV below.

*Table IV.—Ethyl cellulose deashing in various organic solvents*

| Example No. | Solvent | Concentration in Water (Percent) | Acid | Carboxyl Ash (Percent Na₂CO₃) |
|---|---|---|---|---|
| 24 | Acetone | 15 | HCl | 0.08 |
| 25 | Ethyl Acetate | 10 | HCl | 0.05 |
| 26 | Butyl Acetate | 15 | HCl | 0.01 |
| 27 | Acetone | 30 | HCl | 0.05 |
| 28 | do | 15 | $H_2SO_4$ | 0.11 |
| 29 | do | 15 | HAC | 0.02 |
| 30 | do | 15 | $HNO_3$ | 0.07 |
| 31 | Ethyl Acetate | 10 | $H_2SO_4$ | 0.13 |
| 32 | do | 10 | HAC | 0.02 |
| 33 | do | 10 | $HNO_3$ | 0.12 |

In the examples, the ash content of ethyl cellulose was determined by titrating a sample dissolved in an alcohol-benzene mixture to a pH value of 4.8 with standard acid utilizing a pH meter. The acid titration is a measure of the carboxyl groups to which metallic ions are attached (ash expressed as percent $Na_2CO_3$).

The examples illustrate the improvement in deashing obtained in accordance with the invention. Thus, adequate ash removal was obtained even at the relatively low solvent concentrations of 10 and 15%, whereas the practice heretofore has necessitated the use of solvent concentrations in excess of 30%.

The cellulose ethers that are employed in practicing this invention are organic solvent-soluble, i.e., they are soluble in any of the common organic solvents such as acetone, benzene, toluene—alcohol, methanol, ethanol, ethyl acetate, butyl acetate and the like. The primary factor that determines whether or not a cellulose ether is organic solvent-soluble is the degree of substitution of the cellulose ether, and the extent of etherification necessary to produce an organic solvent-soluble cellulose ether is known to those skilled in the art. For example, ethyl cellulose having an ethoxyl content between about 37% and about 52%, preferably between about 43% and about 48%, and having a viscosity of at least about 5 centipoises, is particularly suitable.

One method of preparing such an ethyl cellulose involves the preparation of an alkali cellulose by contacting a cellulosic material with strong caustic. The resulting alkali cellulose is treated in an autoclave under pressure with an excess of ethyl chloride and the resulting mixture is then distilled to remove ether and alcohol by-products as well as unreacted ethyl chloride. The resulting ethyl cellulose is then water-washed. In addition to ethyl cellulose, other cellulose ethers can be treated in accordance with this invention. For example, the process is applicable to the deashing of propyl cellulose, ethyl propyl cellulose, ethyl butyl cellulose, methyl ethyl cellulose, benzyl cellulose and the like.

In addition to the cellulose ethers described above, the invention is generally applicable to organic solvent-soluble cellulose ethers. For example, ethyl hydroxyethyl cellulose can be treated in accordance with the invention to produce a product which is substantially ash-free. Ether-ester derivatives of cellulose can also be treated in accordance with the process of the invention, but in these ether-ester derivatives, the ether grouping is the dominant substituent and the ester grouping is present only in a minor amount. However, the degree of substitution of the ether-ester derivative is such that the derivative is soluble in the organic solvents named above. Throughout the specification and claims the term "cellulose ether" will be employed in the description of the invention. It will be understood that this term includes those ether-ester cellulose derivatives wherein the ether substituent is the dominant substituent and the ester substituent is present only in a minor amount as well as unesterified cellulose ethers.

The aqueous solvent media contemplated for use herein are aqueous solutions of a water-miscible organic solvent for the cellulose ether, the concentration of the solvent in the solution being such that the cellulose ether is substantially insoluble therein. Illustrative of the organic solvents that can be used are ketones, esters and ethers. Typical compounds are acetone, dioxane, tetrahydrofuran, methyl acetate, ethyl acetate, butyl cellosolve and the like. The preferred organic solvents are the lower water-miscible aliphatic alcohols, for example, methanol, ethanol, propanol, isopropanol and the like, with isopropanol being the most preferred.

In general, the concentration of solvent in the aqueous solution will vary from about 10% to about 30% depending on the particular solvent used, the type of cellulose ether, the nature and amount of surfactant, and the temperature. In most cases adequate deashing is obtainable at solvent concentrations of 20% or below. However, improved deashing is obtainable at solvent concentrations up to about 50%. Hence, while the invention permits the use of lower solvent concentrations, higher concentrations may be used, if desired.

For effective deashing the aqueous solvent media should be acidified until the pH is substantially below 6 and preferably within the range of 1.5 to 3.5. A pH higher than 3.5 can be used, but poor deashing of the cellulose ether results, and at a pH lower than 1.5 the cellulose ether has a tendency to degrade. Various acidic materials can be employed to effect the desired pH adjustment in the deashing operation. The inorganic acids such as hydrochloric, nitric and sulfuric are preferred, with hydrochloric acid being the most preferred. Organic acids, such as acetic acid, may also be used.

The deashing of the cellulose ether in accordance with the invention may be carried out at room temperature or at elevated temperatures of 80° C. or higher. The use of higher temperatures in the process give generally better results and hence are preferred. The contact time for the deashing step is variable, but a contact time within the range of 0.25 to 5.0 hours will generally effect the desired deashing of the cellulose ether and hence is preferred.

The surfactants or wetting agents contemplated for use herein may be either the ionic or nonionic type. However, the ionic type gives better results and hence is preferred. The ionic surfactants which are useful herein include by way of example water-soluble alkali metal salts of saturated and unsaturated fatty acids containing 10 or more carbon atoms, water-soluble alkali metal salts of alkylated naphthalenesulfonic acids or of alkylated benzenesulfonic acids, water-soluble alkali metal salts of sulfated or sulfonated fatty alcohols containing 10 or more carbon atoms, long chain alkylarylsulfonates, and so on.

The nonionic surfactants which are useful herein include by way of example, condensation products of ethylene oxide and long chain fatty acids and alcohols or long chain alkyl phenols.

The examples herein illustrate the use of a sodium sulfate derivative of 7-ethyl-2-methyl-undecanol-4, a surfactant material solid under the trade name "Tergitol 4," the sodium salt of sulfonated oleic acid sold under the trade name "Sulfonate OA 5," an alkyl benzene sodium sulfonate sold under the trade name "Ultrawet 35KX," polyethylene glycol ethers of an alkylated phenol sold under the trade name "Synthetics AF-200," polyethylene glycol ethers of rosin alcohol sold under the trade name "Synthetics AD-400," and sorbitan monostearate polyoxyethylene derivative sold under the trade name "Tween 60."

The amount of surfactant material utilized will vary depending on a number of factors such as the nature of the surfactant material, the nature and type of cellulose ether and the conditions of treatment. In some cases an improvement has been noted when the concentration of surfactant material is as low as 0.05% based on the solution. In general, however, the concentration of surfactant material will be within the range from 0.1% to about 1% based on the solution. The preferred range is from about 0.2% to about 0.5%.

After the desired deashing of the cellulose ether has been effected, the cellulose ether is separated and recovered from the resulting mixture. Suitable methods of recovering cellulose ether are centrifuging, filtration, decantation or draining the solid cellulose ether from the accompanying liquid. The recovered cellulose ether is then washed with either water or additional amounts of aqueous alcohol solution. A series of washing steps is usually necessary in order to effect the removal of salts, excess acid and undesirable low molecular weight degraded cellulosic material. Washing is continued and is considered complete when the pH of the effluent liquor from the washing step is essentially the same as that of the liquid used for washing which will usually, but not always, be within the range from about 4.2 to about 6.0.

Since the cellulose ether resulting from the deashing operation is subject to rapid oxidation and depolymerization upon exposure to heat unless properly stabilized, it is desirable and the usual practice to add a stabilizing agent. This may be done during the washing step or at any time subsequent thereto. Any suitable type of stabilizing agent, for example, various phenolic compounds such as diamylphenol and the like, may be utilized for effecting the desired stabilization of the deashed cellulose ether.

What I claim and desire to protect by Letters Patent is:

1. The process of deashing organic solvent-soluble cellulose ethers selected from the group consisting of alkyl and hydroxyalkyl cellulose ethers which comprises treating the same at a temperature not in excess of 80° C. and at substantially atmospheric pressure with an acidified aqueous solution of a water-miscible organic solvent for the cellulose ether in the presence of a surfactant material, the pH of the solution being from substantially below 6 to about 1.5, the amount of said solvent and surfactant being about 10%–50% and about 0.05%–1.0% respectively by weight of said solution.

2. The process of deashing organic solvent-soluble ethyl cellulose which comprises treating the same at a temperature not in excess of 80° C. and at substantially atmospheric pressure with an acidified aqueous solution of a water-miscible organic solvent for the ethyl cellulose containing a surfactant material, the pH of the solution being from substantially below 6 to about 1.5, the amount of said solvent and surfactant being about 10%–50% and about 0.05%–1.0% respectively by weight of said solution.

3. The process of deashing organic solvent-soluble cellulose ethers selected from the group consisting of alkyl and hydroxyalkyl cellulose ethers which comprises treating the same at a temperature not in excess of 80° C. and at substantially atmospheric pressure with an acidified aqueous solution of a lower aliphatic alcohol containing a surfactant material, the pH of the solution being from substantially below 6 to about 1.5, the amount of said solvent and surfactant being about 10%–50% and about 0.05%–1.0% respectively by weight of said solution.

4. The process of claim 3 wherein the lower aliphatic alcohol is isopropanol.

5. The process of deashing organic solvent-soluble cellulose ethers selected from the group consisting of alkyl and hydroxyalkyl cellulose ethers which comprises treating the same at a temperature not in excess of 80° C. and at substantially atmospheric pressure with an acidified aqueous solution of a lower aliphatic alcohol containing an ionic surfactant material, the pH of the solution being from substantially below 6 to about 1.5, the amount of said solvent and surfactant being about 10%–50% and about 0.05%–1.0% respectively by weight of said solution.

6. The process of deashing organic solvent-soluble cellulose ethers selected from the group consisting of alkyl and hydroxyalkyl cellulose ethers which comprises treating the same at a temperature not in excess of 80° C. and at substantially atmospheric pressure with an acidified aqueous solution of a lower aliphatic alcohol containing a nonionic surfactant material, the pH of the solution being from substantially below 6 to about 1.5, the amount of said alcohol and surfactant being about 10%–50% and about 0.05%–1.0% respectively by weight of said solution.

7. The process of deashing organic solvent-soluble cellulose ethers selected from the group consisting of alkyl and hydroxyalkyl cellulose ethers which comprises treating the same at a temperature not in excess of 80° C. and at substantially atmospheric pressure with an acidified aqueous solution of a lower aliphatic alcohol containing an ionic surfactant material, the pH of the solution being within the range from about 1.5 to about 3.5, the amount of said alcohol and surfactant being about 10%–50% and about 0.05%–1.0% respectively by weight of said solution.

8. The process of claim 7 wherein the ionic surfactant material is a sodium sulfate derivative of 7-ethyl-2-methyl-undecanol-4.

9. The process of claim 7 wherein the ionic surfactant material is the sodium salt of sulfonated oleic acid.

10. The process of claim 7 wherein the ionic surfactant material is an alkyl benzene sodium sulfonate.

References Cited in the file of this patent

UNITED STATES PATENTS

| | | |
|---|---|---|
| 1,943,461 | Traill et al. | Jan. 16, 1934 |
| 2,258,171 | Barry | Oct. 7, 1941 |
| 2,711,965 | Pyle | June 28, 1955 |
| 2,746,958 | Pyle | May 22, 1956 |